Patented May 23, 1939

2,159,506

UNITED STATES PATENT OFFICE 2,159,506

ANTHRAQUINONE DYESTUFFS CAPABLE OF BEING CHROMED

Georg Kränzlein, Hans Schlichenmaier, and Theodor Meissner, Frankfort-on-the-Main, Germany, assignors to General Aniline Works, Inc., New York, N. Y., a corporation of Delaware No Drawing. Application August 26, 1937, Serial No. 161,160. In Germany September 26, 1936

5 Claims. (Cl. 260—372)

The present invention relates to anthraquinone dyestuffs capable of being chromed.

We have found that anthraquinone derivatives of the general formulae:

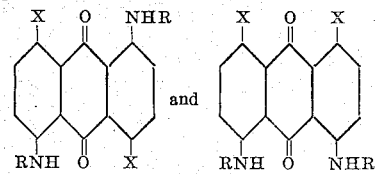

where in X represents a hydroxyl-, amino-, alkylamino- or arylamino group and R stands for the radical of an aromatic-ortho-hydroxy-carboxylic acid which contains one or more sulfonic acid groups, which do not contain a sulfonic acid group in the anthraquinone nucleus and the salts and substitution products thereof, are dyestuffs the dyeings of which by a treatment with an agent yielding chromium may be transformed into fast chromium lakes. According to the kind of amino-ortho-hydroxy-carboxylic acid used dyeings are obtained the tints of which lie between grey and green.

The dyestuffs may be prepared by starting from dihalogen-dihydroxy- or dihalogen-diamino-anthraquinones which do not possess sulfonic acid groups in the anthraquinone nucleus, substituting the halogen for the radical of an aromatic amino-ortho-hydroxycarboxylic acid and sulfonating the products obtained, or exchanging the halogen directly for the radical of a sulfonated aromatic amino-ortho-hydroxycarboxylic acid.

Furthermore, it is possible when starting from, for instance, dihydroxy- or diamino-dihalogen-anthraquinonedisulfonic acids the sulfonic acid groups of which are in beta-position, to substitute for the halogen the radical of an aromatic amino-ortho-hydroxycarboxylic acid or of a sulfonated aromatic amino-ortho-hydroxy-carboxylic acid and to split off the sulfonic acid groups contained in the anthraquinone nucleus by treating the compound in a neutral or alkaline medium with a reducing agent, preferably with sodium hydrosulfite. If non-sulfonated aromatic amino-ortho-hydroxy-carboxylic acids are used a subsequent sulfonation is required.

The following examples serve to illustrate the invention but they are not intended to limit it thereto; the parts are by weight unless stated otherwise; the relationship between parts by weight and parts by volume is that which exists between the kilo and the liter:

(1) 10 parts of 1,5-dihydroxy-4,8-dichloroanthraquinone are mixed in a finely divided form with 40 parts of 3-amino-2-hydroxy-5-sulfobenzoic acid, 45 parts of dehydrated potassium acetate, 2 parts of copper acetate, 1 part of copper powder and 25 parts of water and the mixture is heated with 250 parts by volume of methanol for 24 hours in a closed vessel at a temperature between 110° C. and 120° C., the pressure rising to 7 atmospheres. The green mass is acidified with hydrochloric acid of 20 per cent. strength, filtered with suction, washed first with hydrochloric acid of 20 per cent. strength until the washing liquid has no longer a brown coloration and then with a saturated solution of sodium chloride until the reaction is almost neutral. The residue remaining on the filter is stirred with a sodium bicarbonate solution in order to eliminate a small quantity of unchanged 1,5-dihydroxy-4,8-dichloroanthraquinone. When the dyestuff has completely dissolved, a small quantity of kieselguhr is introduced, while stirring, and the whole is filtered. The dyestuff solution is salted out with sodium chloride, the dyestuff is filtered with suction, washed with sodium chloride solution until neutral and dried.

It dissolves in concentrated sulfuric acid to a blue solution, which, on addition of para-formaldehyde, becomes bottle-green. It dissolves in caustic soda solution and sodium carbonate solution to a blue solution. On addition of sodium chloride to this solution a green precipitate is obtained.

The dyestuff dyes wool in an acid bath blue tints which, when chromed, become green and have good properties of fastness to washing, to fulling and to light.

(2) 10 parts of 1,5-dihydroxy-4,8-dichloroanthraquinone, 40 parts of 3-amino-2-hydroxy-5-sulfobenzoic acid, 40 parts of dehydrated potassium acetate, 2 parts of copper acetate and 1 part of copper powder are intimately mixed and introduced, while stirring, into 300 parts of glycol together with 30 parts of water. The whole is heated for 20 hours at 110° C. to 120° C.; already after a short time a green coloration of the mass may be observed. The product is further worked up as described in Example 1. The dyestuff more closely defined in Example 1 is obtained.

(3) An intimate mixture of 10 parts of finely powdered 1,5-dihydroxy-4,8-dichloroanthraquinone, 40 parts of 5-amino-2-hydroxy-3-sulfobenzoic acid, 45 parts of dehydrated potassium acetate, 2 parts of copper acetate and 1 part of copper powder is heated at 130° C. to 140° C. for 24 hours in a closed vessel together with 25 parts of water and 250 parts by volume of methanol, the pressure attaining about 10 atmospheres. The grey mass is acidified with hydrochloric acid with addition of a sodium chloride solution, filtered with suction and washed with a mixture of a sodium chloride solution and hydrochloric acid of 5 per cent. strength. The product is then stirred with water at 40° C. to 50° C.; a blue solution of the dyestuff is thus obtained, a small quantity of kieselguhr is added, while stirring, and the whole is filtered. The solution of the dyestuff is salted out after addition of caustic soda solution; the dyestuff is filtered with suction and washed with water until the fluorescence has ceased. It is then dissolved in hot water acidified with acetic acid, filtered and salted out in a hot solution. The dyestuff is filtered with suction, washed with a solution of sodium chloride of about 8 per cent. strength until neutral and dried.

It dissolves in concentrated sulfuric acid to a blue solution which, on addition of para-formaldehyde, becomes blue-green. It dissolves in sodium carbonate solution and caustic soda solution to blue solutions; on addition of a solution of sodium chloride to these solutions a blue precipitate is obtained.

The dyestuff dyes wool in an acid bath blue tints which, when chromed, become grey with good properties of fastness.

(4) 10 parts of 1,5-dihydroxy-4,8-dichloroanthraquinone, 40 parts of 5-amino-2-hydroxy-3-sulfobenzoic acid, 40 parts of dehydrated potassium acetate, 2 parts of copper acetate and 1 part of copper powder are well mixed and introduced, while stirring, into 400 parts by volume of glycol together with 30 parts of water. The whole is heated for 20 hours at 130° C. to 140° C.; already after a short time a blue-grey mass is obtained which is worked up as described in Example 3. The dyestuff thus obtained is the same as that described in Example 3 and dyes chromed wool grey tints of good properties of fastness.

(5) 31 parts of 5-amino-2-hydroxybenzoic acid are dissolved at about 50° C. in 150 parts of water, while adding 15 parts of dehydrated sodium carbonate. This solution is stirred at a temperature of at first 50° C. to 60° C. with 30 parts of sodium 4,8-dibromanthrarufin-2,6-disulfonic acid which are made into a paste with 150 parts of water, 20 parts of sodium bicarbonate and 2 parts of cuprous chloride; the temperature is then gradually raised to 90° C. until there is no longer any foaming of the mass and no parent material observable under the microscope. The whole is then acidified with hydrochloric acid and a solution of sodium chloride is added; the mixture is boiled and allowed to cool; the dyestuff obtained is filtered with suction, subsequently washed with dilute hydrochloric acid to which a solution of sodium chloride has been added, and washed with a solution of sodium chloride of 20 per cent. strength until neutral; the solid matter is made into a paste by means of water. In order to split off the sulfonic acid group contained in the anthraquinone nucleus, from the 1,5-dihydroxy-4,8-di-(4'-hydroxy-3'-carboxy-phenyl)-aminoanthraquinone-2,6-disulfonic acid thus produced 150 parts of a paste containing 25 per cent. of this dyestuff are, for instance, stirred in 2000 parts of water; there are added 35 parts of dehydrated sodium carbonate and then gradually 25 parts of powdered sodium hydrosulfite. The whole is stirred for a prolonged time, the color becomes first red-violet and then olive. 60 parts of caustic soda solution of 40° Bé. are added and the mixture is heated at 50° C.–60° C. until a blue solution has formed. The product is then salted out and filtered with suction; the residue remaining on the filter is acidified with hydrochloric acid, again filtered with suction, washed with water until neutral and dried.

The 1,5-dihydroxy-4,8-di-(4'-hydroxy-3'-carboxyphenyl)-amino-anthraquinone thus obtained is sulfonated, for instance, by heating it at 150° C. to 160° C. for 10 hours in 20 times its weight of sulfuric acid monohydrate; a blue dyestuff is obtained which dyes wool in an acid bath blue tints which, when chromed, become grey and have properties very similar to those of the dyestuff described in Example 3.

(6) 6 parts of dichlorochrysazine (4,5-dichloro-1,8-dihydroxyanthraquinone) are heated at 120° C. to 130° C. for 24 hours in a closed vessel with 25 parts of 3-amino-2-hydroxy-5-sulfobenzoic acid, 30 parts of dehydrated potassium acetate, 1.5 parts of copper acetate and 1 part of copper powder in 200 parts of methanol of 90 per cent. strength, the pressure rising to 7 to 8 atmospheres. The blue mass is acidified with hydrochloric acid after addition of a small quantity of a solution of sodium chloride, filtered with suction and subsequently washed with hydrochloric acid of 20 per cent. strength to which a small quantity of a sodium chloride solution is added. The mass is then washed with a saturated solution of sodium chloride until nearly neutral; the solid matter is stirred with a solution of sodium bicarbonate, to which a small quantity of kieselguhr is added, and filtered. The filtrate is salted out. The precipitated dyestuff is filtered with suction, washed with a solution of sodium chloride until neutral and dried.

The dyestuff dissolves in concentrated sulfuric acid to a blue-green solution which, on addition of boric acid or para-formaldehyde, becomes blue. In a solution of sodium carbonate it is soluble to a blue solution and in caustic soda solution to a blue-green solution. On addition of sodium chloride green flakes precipitate from this solution. The dyestuff dyes wool in a bath acidified with acetic acid blue tints which, when chromed, become green and have good properties of fastness.

(7) By proceeding as indicated in Example 6 but using 5-amino-2-hydroxy-3-sulfobenzoic acid, a grey mass is obtained which is acidified with hydrochloric acid of 5 per cent. strength with addition of a solution of sodium chloride, filtered with suction and washed with hydrochloric acid of the same concentration until the washing liquid has no longer a brown coloration. The mass is subsequently washed with a dilute solution of sodium carbonate with addition of a solution of sodium chloride and the residue remaining on the filter is dissolved in hot water, while adding acetic acid. After filtering, the product is salted out, filtered with suction, washed with a solution of sodium chloride of 10 per cent. strength until neutral and dried.

The dyestuff thus obtained dissolves in concentrated sulfuric acid to a blue solution which, on addition of boric acid, becomes somewhat redder and on addition of paraformaldehyde, somewhat greener. It dissolves in sodium carbonate solution and caustic soda solution to blue solutions. On addition of sodium chloride blue flakes precipitate from these solutions. The dyestuff dyes wool in an acid bath blue tints, which, when chromed, become grey and have good properties of fastness.

(8) 7 parts of 1,5-dichloro-4,8-diaminoanthraquinone are stirred at 120° C. to 130° C. for 20 hours with 30 parts of 3-amino-2-hydroxy-5-sulfobenzoic acid, 35 parts of dehydrated potassium acetate, 1.5 parts of copper acetate and 1 part of copper powder in 200 parts of glycol of 90 per cent. strength. The blue mass is acidified with hydrochloric acid of 5 per cent. strength, filtered with suction and washed first with hydrochloric acid of 5 per cent. strength until the washing liquid has no longer a brown coloration. and then with water. The solid matter is stirred with a solution of sodium bicarbonate, kieselguhr is added and after filtering the product is salted out. The dyestuff is worked up in the usual manner; it is soluble in concentrated sulfuric acid to a brown-red solution which, on addition of para-formaldehyde, becomes blue. It dissolves in sodium carbonate solution and caustic soda solution to blue solutions from which green flakes are precipitated by addition of sodium chloride.

It dyes wool in an acid bath blue tints which, when chromed, become green and have good properties of fastness.

(9) By substituting in Example 8 for the 3-amino-2-hydroxy-5-sulfobenzoic acid the same weight of 5-amino-2-hydroxy-3-sulfobenzoic acid, a dyestuff is obtained which dissolves in concentrated sulfuric acid to a brown-red solution which, on addition of para-formaldehyde, becomes steel-blue. It dissolves in sodium carbonate solution and caustic soda solution to blue solutions from which grey-blue flakes are precipitated by addition of sodium chloride. In a reddish blue acid dye liquor it dyes wool blue tints which, when chromed, become grey and have good properties of fastness.

(10) 7 parts of 1,5-diamino-2,4,6,8-tetrachloranthraquinone are heated for 24 hours in a closed vessel at 120° C. to 130° C. with 30 parts of 3-amino-2-hydroxy-5-sulfobenzoic acid, 35 parts of dehydrated potassium acetate, 1.5 parts of copper acetate and 1 part of copper powder in 200 parts of methanol of 95 per cent. strength, the pressure rising to 8 to 9 atmospheres. The grey reaction mass is acidified with N-hydrochloric acid, filtered with suction and washed with N-hydrochloric acid until the washing liquor is no longer colored.

The product is then stirred with sodium bicarbonate solution, kieselguhr is added, the whole is filtered and the filtrate is salted out. The dyestuff is filtered with suction, washed with saturated sodium chloride solution until neutral and dried.

The dyestuff dissolves in concentrated sulfuric acid to a currant-colored solution which, on addition of para-formaldehyde, becomes blue-green. It dissolves in sodium carbonate solution to a steel-blue and in caustic soda solution to a green-blue solution; from these solutions an olive-green precipitate is obtained on addition of sodium chloride.

The dyestuff dyes wool in a blue acid bath blue tints which, when chromed, become green with good properties of fastness.

(11) On working in the same manner as described in Example 10 and using 5-amino-2-hydroxy-3-sulfobenzoic acid a dyestuff is obtained which dissolves in concentrated sulfuric acid to a brown-red solution which, on addition of para-formaldehyde, becomes blue-green. It dissolves in sodium carbonate solution to a blue and in caustic soda solution to an olive-green solution.

It dyes wool in a steel-blue acid solution blue tints which, when chromed, become grey with good properties of fastness.

(12) 7 parts of 4,8-dibromo-1,5-di-dimethylaminoanthraquinone are mixed with 30 parts of 3-amino-2-hydroxy-5-sulfobenzoic acid, 35 parts of dehydrated potassium acetate, 1.5 parts of copper acetate and 1 part of copper powder and the whole is heated at 100° C. for 20 hours in glycol of 90 per cent. strength. The blue-green mass is acidified with addition of sodium chloride solution, filtered with suction and worked up in the manner above described.

A dyestuff is obtained which dissolves in concentrated sulfuric acid to a violet solution which, on addition of para-formaldehyde, becomes blue-green. It dissolves in sodium carbonate solution to a blue-green and in caustic soda solution to a green solution. In concentrated hydrochloric acid it is soluble to a red solution. It dyes wool in an acid bath blue-green tints which, when chromed, become green of good properties of fastness.

We claim:

1. The members of the group consisting of compounds of the general formulae:

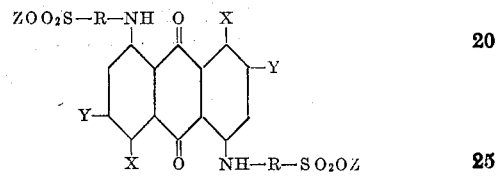

and

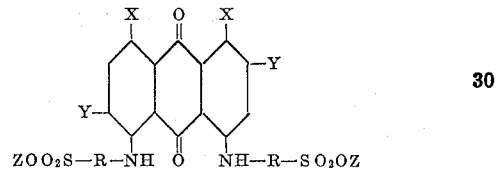

wherein X represents a member of the group consisting of hydroxyl, amino, alkylamino and arylamino, Y represents a member of the group consisting of hydrogen and chlorine, Z represents a member of the group consisting of hydrogen and an alkali metal atom and R represents the radical of an aromatic ortho-hydroxycarboxylic acid.

2. The compounds of the general formula:

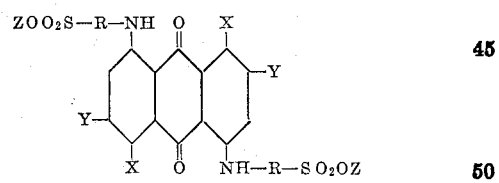

wherein X represents a member of the group consisting of hydroxyl, amino-, alkylamino and arylamino, Y represents a member of the group consisting of hydrogen and chlorine, Z represents a member of the group consisting of hydrogen and an alkali metal atom and R represents the radical of an aromatic ortho-hydroxycarboxylic acid.

3. The compound of the formula

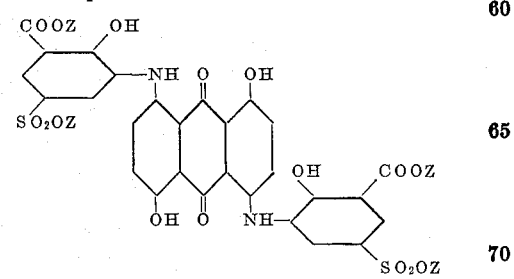

wherein Z represents a member of the group consisting of hydrogen and an alkali metal atom, being a dyestuff which dyes wool from an acid bath blue tints which, when chromed, become green and have good properties of fastness to washing, to fulling and to light.

4. The compound of the formula

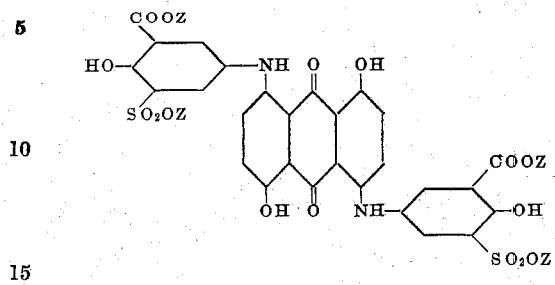

wherein Z represents a member of the group consisting of hydrogen and an alkali metal atom, being a dyestuff which dyes wool from an acid bath blue tints which, when chromed, become grey with good properties of fastness.

5. The compound of the formula

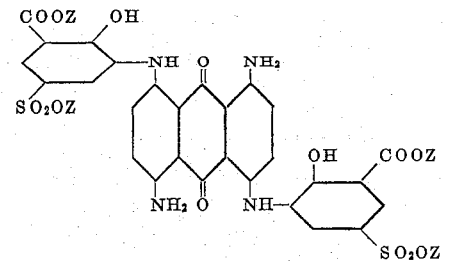

wherein Z represents a member of the group consisting of hydrogen and an alkali metal atom, dyeing wool from an acid bath blue tints which, when chromed, become green and have good properties of fastness.

GEORG KRÄNZLEIN.
HANS SCHLICHENMAIER.
THEODOR MEISSNER.